UNITED STATES PATENT OFFICE.

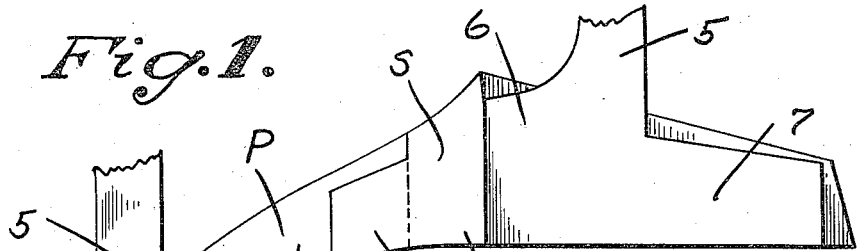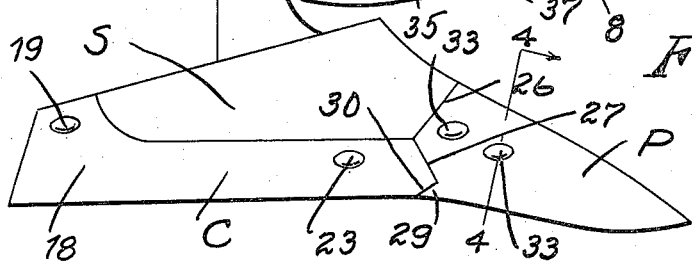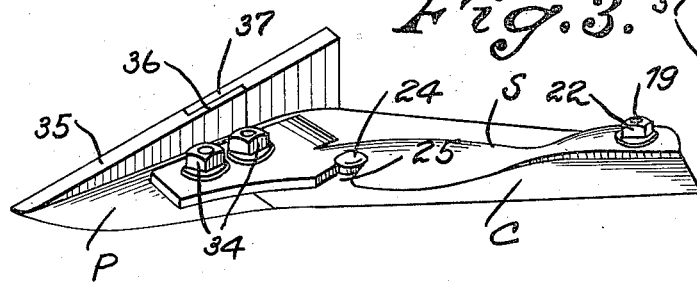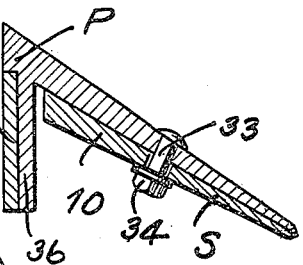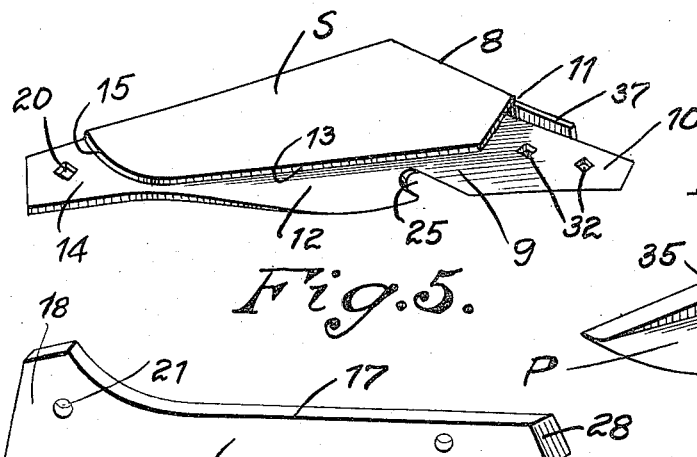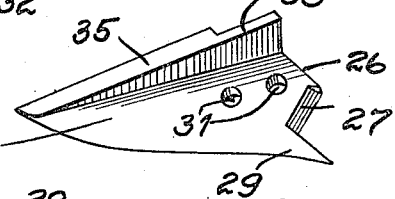

JOHN HARRISON, OF DOUGLAS, ARIZONA, ASSIGNOR OF ONE-HALF TO H. P. WILEY, OF DOUGLAS, ARIZONA.

PLOW.

1,176,892. Specification of Letters Patent. Patented Mar. 28, 1916.

Application filed August 25, 1913. Serial No. 786,501.

*To all whom it may concern:*

Be it known that I, JOHN HARRISON, a citizen of the United States, residing at Douglas, in the county of Cochise, State of Arizona, have invented certain new and useful Improvements in Plows; and I do hereby declare the following to be a full, clear, and exact description of the invention, such as will enable others skilled in the art to which it appertains to make and use the same.

This invention relates to certain novel and useful improvements in plows.

The invention described and shown herein embodies, among other features, a plow provided with a detachable point and a removable cutting edge which are so constructed and arranged as to be readily assembled and disassembled, thereby enabling these parts to be removed and replaced at will.

It is my purpose in the present instance to provide a plow which will embody in its construction the desired features of strength and durability and which may be manufactured and marketed at a relatively low cost.

Furthermore, I aim to provide a plow wherein the detachable point and the removable cutting edge are correlated and arranged relative to the plow so as to form a compact implement wherein the share and landside reach substantially down to the cutting edge and point.

With the above recited objects and others of a similar nature in view, my invention consists in the construction, combination and arrangement of parts set forth in and falling within the scope of the appended claim.

In the accompanying drawings: Figure 1 is a view in side elevation of a plow share with the detachable point and removable cutting edge applied thereto. Fig. 2 is a view of the landside thereof. Fig. 3 is a bottom plan view showing the underside of the share with the detachable point and the removable cutting edge connected therewith. Fig. 4 is a cross sectional view taken through the plow point and share. Fig. 5 is a detail perspective view of the plow share. Figs. 6 and 7 are detail perspective views of the cutting edge and detachable point respectively.

Referring now to the accompanying drawings in detail, the numeral 5 indicates the usual standard having a forwardly extending foot 6 and heel 7. Extending from the standard 5 and integral therewith is a frog (not shown) to which a plow share indicated as an entirety by S, and the usual mold board (not shown) are adapted to be attached. The removable cutting edge is indicated as a whole by the letter C, while the detachable point is indicated as an entirety by the letter P. The share S includes a landside edge 8 and a front edge 9, the latter being disposed at an obtuse angle to the edge 8. The front portion of the share is cut away as at 10 so that a shoulder 11 is formed, while the longitudinal bottom portion of the share is cut away as at 12 to form the shoulder 13, and the rear of the share is cut away to form the tongue 14 and the shoulder 15. The landside portion of the share terminates short of the front edge of the share and one-half of a lap joint extends upward from the forward cut away portion 10. As will be readily noted from the drawings, the removable cutting edge C is designed to fit over the lower longitudinal portion of the plow share which is shown at 12 and the tongue 14 at the rear of the share, and consequently this cutting member C has the upper longitudinal edge thereof cut away as at 17 to fit against the longitudinal shoulder 13 of the share, the rear end of the cutting member terminating in an enlargement 18 which fits over the tongue 14. A bolt 19 passes through the alining openings 20 and 21 in the share and cutting member respectively and is secured by a nut 22. The cutting member has also countersunk therein a bolt 23, the shank of which terminates in a head 24 which is designed to seat within the slot 25 formed in the cut away portion 12 of the share.

The point P is formed with a rear top edge 26 which abuts against the adjacent edge of the share, and also has an oppositely inclined lower edge 27 which is beveled to fit over the adjacent beveled edge 28 at the front end of the cutting member, and this lower rear beveled portion of the point terminates in a tongue 29 which fits against the lower cut away end 30 of the cutting member, as is clearly shown in Fig. 1. The plow point is provided with openings 31 which aline with openings 32 formed in the cut away forward end 10 of the plow share, and through these openings pass bolts 33 provided with the usual fastening nuts 34. The plow point is also provided with a landside portion 35, the rear of which is shouldered to form one half of a lap joint which fits beneath the corresponding half of a lap joint shown at 37 formed on the landside of the share. By this construction it will be seen that when the detachable point is assembled on the share, the tongue 37 of the landside of the share fits over the tongue of the landside of the point, and the parts are therefore, tightly joined together.

It will be noted that the shoulder 15 ranges curvingly away from the shoulder 13 with the chord of its curvature at an obtuse angle to the shoulder 13.

From the above description, taken in connection with the accompanying drawings, the construction and manner of employing the invention will be readily apparent. It will be seen that after the plow has been in use for sometime and the point and cutter member have become worn or dulled, the point may be detached and the cutting member removed and both sharpened, or if desired, they may be replaced with new parts.

It will further be noted that in the present instance both the point and the landside lie above and fit on the share, so that when the parts are assembled the outer face of the point and cutter member lie flush with the outer face of the share, while at the same time all the bolts are readily accessible from the underside of the share so that the removable parts may be detached when desired.

What I claim is:

A plow comprising a share having its outer face recessed at its front end, its bottom edge and its rear end portions and having a tongue 37, a cut-away portion in spaced relation to the upper edge of said tongue, the share having resultant shoulders of which the shoulder adjacent the forward cut-away portion is at an obtuse angle to the shoulder adjacent the bottom cut-away portion and the shoulder adjacent the rear cut-away portion ranges curvingly with its chord at an obtuse angle to the shoulder adjacent the bottom cut-away portion, a point removably disposed upon the forward cut-away portion of the share and positioned against the shoulder adjacent the forward cut-away portion and having a recess in its rear edge below said shoulder, said point having also a cut-away portion in which is received said tongue 37, and a cutting member having a pointed forward end seated in said recess of the point, the bottom face of the cutting member being in position to form a continuation of the bottom face of the point and the upper face of the cutting member being positioned against the shoulders adjacent the bottom and rear cut-away portions of the share, and means for holding the members removably connected.

In testimony whereof, I affix my signature, in the presence of two witnesses.

JOHN HARRISON.

Witnesses:
N. E. DUGAN,
J. M. SPARKS.

Copies of this patent may be obtained for five cents each, by addressing the "Commissioner of Patents. Washington, D. C."